US012218971B1

(12) United States Patent
Sanchez Rola (10) Patent No.: US 12,218,971 B1
(45) Date of Patent: Feb. 4, 2025

(54) SYSTEMS AND METHODS FOR AUTOMATICALLY IDENTIFYING SERVER-SIDE TRACKING ON WEBSITES

(71) Applicant: GEN DIGITAL INC., Tempe, AZ (US)

(72) Inventor: Iskander Sanchez Rola, Antibes (FR)

(73) Assignee: Gen Digital Inc., Tempe, AZ (US)

( * ) Notice: Subject to any disclaimer, the term of this patent is extended or adjusted under 35 U.S.C. 154(b) by 263 days.

(21) Appl. No.: 17/809,625

(22) Filed: Jun. 29, 2022

(51) Int. Cl.
*H04L 9/40* (2022.01)
*G06N 5/048* (2023.01)

(52) U.S. Cl.
CPC ......... *H04L 63/1475* (2013.01); *G06N 5/048* (2013.01)

(58) Field of Classification Search
CPC ............................ H04L 63/1475; G06N 5/048
See application file for complete search history.

(56) References Cited

U.S. PATENT DOCUMENTS

| 8,364,776 | B1* | 1/2013 | Conrad | H04L 63/1416 |
| | | | | 709/216 |
| 8,856,937 | B1* | 10/2014 | Wuest | G06F 21/56 |
| | | | | 713/188 |
| 2017/0103438 | A1* | 4/2017 | Dickinson | G06Q 30/0609 |
| 2017/0178136 | A1* | 6/2017 | Groarke | G06Q 20/12 |
| 2022/0131877 | A1* | 4/2022 | Oest | H04L 63/145 |
| 2022/0327167 | A1* | 10/2022 | Kravitz | G06F 16/951 |

* cited by examiner

*Primary Examiner* — Ayoub Alata
(74) *Attorney, Agent, or Firm* — Greeberg Traurig, LLP (57) ABSTRACT

The disclosed computer-implemented method for automatically identifying server-side tracking on websites may include collecting, by at least one processor, tracker parameters requested by websites. The method may additionally include inferring, by the at least one processor based on the collected tracker parameters, event forwarding by detecting two or more of the websites that request a similar set of the tracker parameters. The method may also include comparing, by the at least one processor, content of the two or more of the websites. The method may further include performing, by the at least one processor, a security action in response to the comparison. Various other methods, systems, and computer-readable media are also disclosed.

20 Claims, 8 Drawing Sheets

| movies | × | 🔍 |

Q All  ▦ News  ⊕ Maps  ▣ Videos  ▣ Images  ⋮ More

Tools

Page 2 of about 11,130,000,000 results (1.08 seconds)

https://moviesontap.com

Movies on Tap
STARTING AT 7PM. The gritty crime classics of film noir come out at night. Movies on Tap Presents the darker side of cinema on Sunday Night Noir.

https://web.com  ⋮

WEB: Ratings, Reviews, and Where to Watch the Best Movies ...
WEB is the world's most popular and authoritative source for movie, TV and celebrity content. Find ratings and reviews for the newest movie and TV shows.

https://play.google.com>store>movies  ⋮

Movies & TV on Google Play
Enjoy millions of the latest Android apps, games, music, movies, TV, books, magazines & more.
... New Movies releases ... Most popular movies.

https://tracker.com ━━━━━━ ment  ⋮

17 Sci- ━━ eapflix You Absolutely Need To Watch

[SERVER-SIDE TRACKING DETECTED ✕]

Search Results 502

Alert 500

SYSTEMS AND METHODS FOR AUTOMATICALLY IDENTIFYING SERVER-SIDE TRACKING ON WEBSITES

BACKGROUND

Web tracking is an extremely common practice on the current internet. However, tracking blocking software is also becoming considerably popular on the clients' side. In order to bypass the defenses employed by users, trackers are starting to implement new methods that allow them to obtain information from the customers without the need of conventional techniques. One of the most popular of these new methods is "server-side tracking." Server-side tracking is based on collecting all the tracking information in one single point, and later redistributing it around to one or more stakeholders. Many companies have started to test these solutions with some of their partners. The present disclosure, therefore, identifies and addresses a need for systems and methods for automatically identifying server-side tracking on websites.

SUMMARY

As will be described in greater detail below, the present disclosure describes various systems and methods for automatically identifying server-side tracking on websites.

In one example, a method for automatically identifying server-side tracking on websites may include collecting, by at least one processor, tracker parameters requested by websites. The method may additionally include inferring, by the at least one processor based on the collected tracker parameters, event forwarding by detecting two or more of the websites that request a similar set of the tracker parameters. The method may also include comparing, by the at least one processor, content of the two or more of the websites. The method may further include performing, by the at least one processor, a security action in response to the comparison.

In some examples, the method may perform the collecting in various ways. For example, the collecting tracker parameters may include collecting information about calls made by the two or more of the websites. Additionally, the collecting tracker parameters may include receiving the tracker parameters from at least one of one or more browser extensions or one or more web crawlers. Also, the collecting tracker parameters may include storing one or more sets of parameters used in calls made by the two or more of the websites, types of the parameters, and at least one length of one or more of the parameters.

In some examples, the method may perform the inferring in various ways. For example, the inferring event forwarding may include identifying at least one case of the two or more of the websites requesting the similar set of the tracker parameters and marking the at least one case as a tracking candidate in response to the identification.

In some examples, the method may perform the comparing in various ways. For example, the comparing content may include comparing website scripts that perform requests for the tracker parameters. In such examples, the method may further include identifying that at least one website of the two or more of the websites is forwarding the tracker parameters to at least one other website of the two or more of the websites based on the comparison of the website scripts. Additionally, the comparing website scripts may include at least one of: performing a static similarity fuzzy hashing analysis at a code and abstract syntax tree level; or performing a dynamic JavaScript analysis that matches patterns between the website scripts.

In some examples, the method may perform one or more different types of security actions. For example, the security action may include improving a data repository of websites automatically identified as performing server-side tracking. Additionally, the security action may include issuing one or more alerts about server-side tracking by at least one website of the two or more of the websites. Also, the security action may include blocking one or more requests for at least one parameter of the tracker parameters. Further, the security action may include blocking access to at least one website of the two or more of the websites.

In one embodiment, a system for automatically identifying server-side tracking on websites may include at least one physical processor and physical memory that includes computer-executable instructions that, when executed by the physical processor, cause the physical processor to collect tracker parameters requested by websites. Additionally, the instructions may cause the physical processor to infer, based on the collected tracker parameters, event forwarding by detecting two or more of the websites that request a similar set of the tracker parameters. Also, the instructions may cause the physical processor to compare content of the two or more of the websites. Further, the instructions may cause the physical processor to perform a security action in response to the comparison.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to collect tracker parameters requested by websites. Additionally, the instructions may cause the computing device to infer, based on the collected tracker parameters, event forwarding by detecting two or more of the websites that request a similar set of the tracker parameters. Also, the instructions may cause the computing device to compare content of the two or more of the websites. Further, the instructions may cause the computing device to perform a security action in response to the comparison.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for automatically identifying server-side tracking on websites. As will be explained in greater detail below, by collecting tracker parameters requested by websites, inferring event forwarding by detecting two or more of the websites that request a similar set of the tracker parameters, comparing content of the two or more of the websites, and performing a security action in response to the comparison, the systems and methods described herein may be able to improve a data repository of websites automatically identified as performing server-side tracking, automatically alert users when a website practices server-side tracking, block such websites, block tracking functionalities of such websites, or combinations thereof.

In addition, the systems and methods described herein may improve the functioning of a computing device by collecting tracking parameters requested by website scripts and automatically identifying server-side tracking by comparing the parameters and comparing the scripts of websites that request similar parameters. This approach may execute dynamically while the user is browsing (e.g., using a browser extension and/or VPN).

Figure 1:
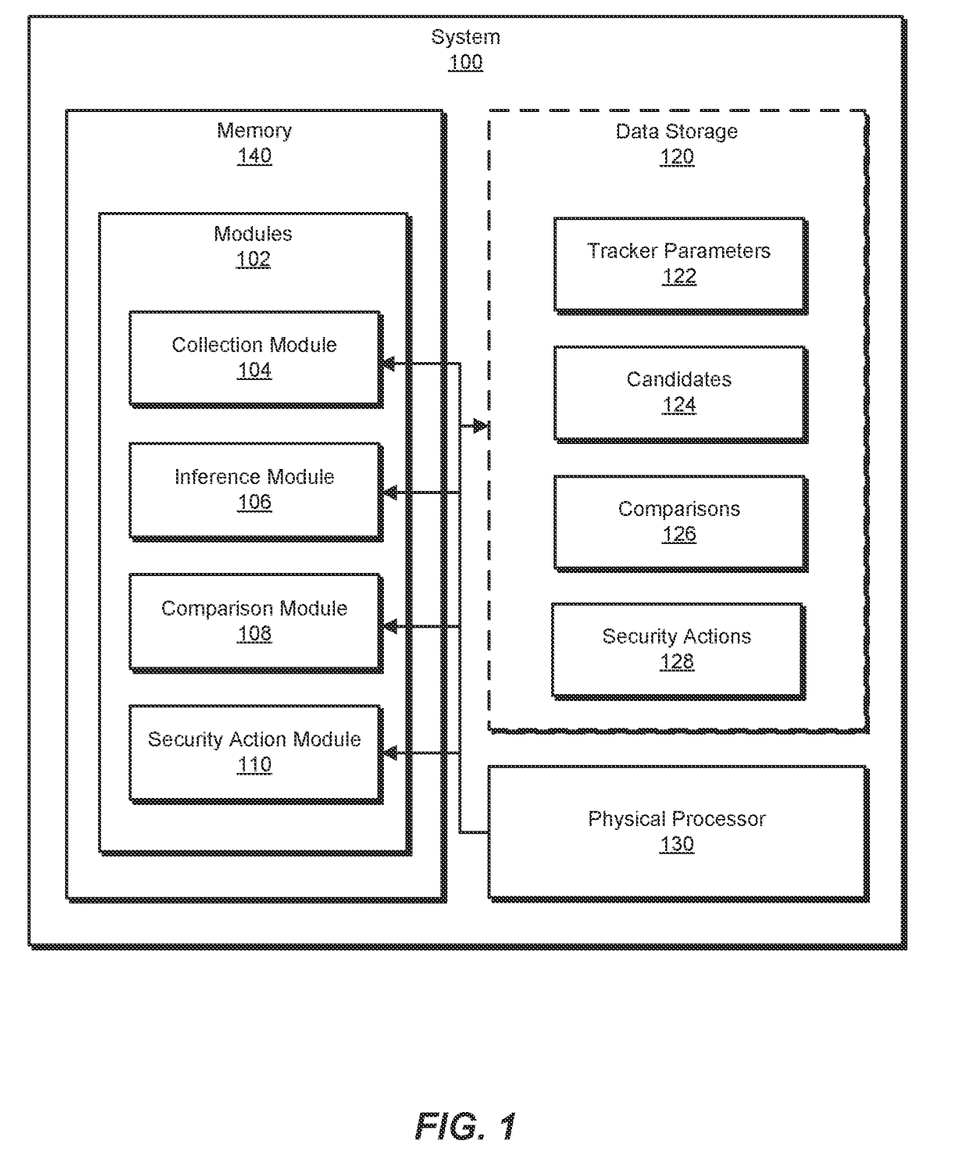
FIG. 1 is a block diagram of an example system for automatically identifying server-side tracking on websites.
Figure 2:
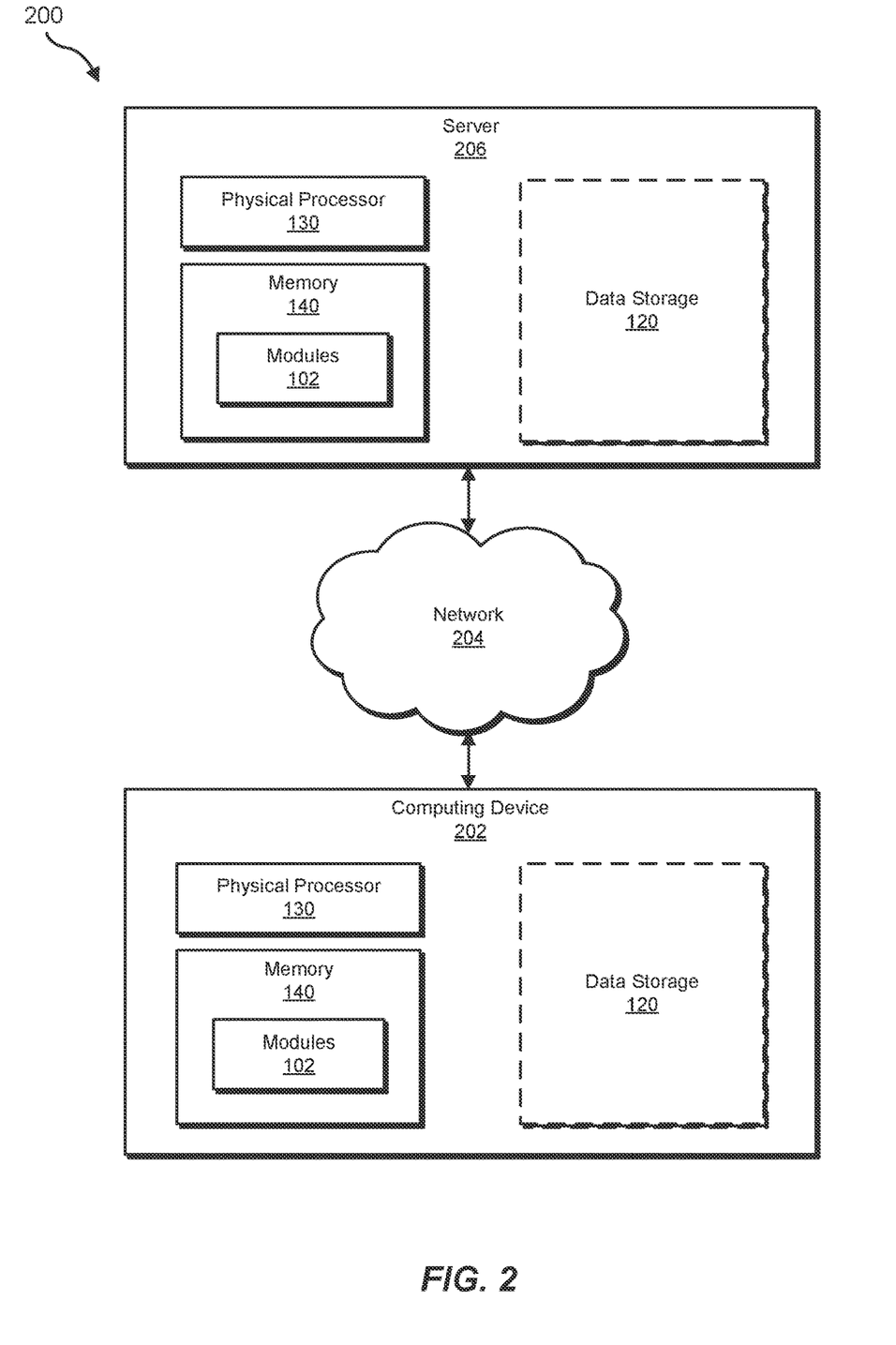
FIG. 2 is a block diagram of an additional example system for automatically identifying server-side tracking on websites.

The following will provide, with reference to FIGS. 1-2, detailed descriptions of example systems for automatically identifying server-side tracking on websites. Detailed descriptions of corresponding computer-implemented methods will also be provided in connection with FIG. 3. Detailed descriptions of security actions performed in response to automatic identification of server-side tracking will further be provided in connection with FIGS. 4-5. In addition, detailed descriptions of an example computing system and network architecture capable of implementing one or more of the embodiments described herein will be provided in connection with FIGS. 7 and 8, respectively.

FIG. 1 is a block diagram of an example system 100 for automatically identifying server-side tracking on websites. As illustrated in this figure, example system 100 may include one or more modules 102 for performing one or more tasks. As will be explained in greater detail below, modules 102 may include a collection module 104, an inference module 106, a comparison module 108, and a security action module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate automatically identifying server-side tracking on websites. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more instances of stored data, such as data storage 120. Data storage 120 generally represents any type or form of stored data. In one example, data storage 120 may include databases, spreadsheets, tables, lists, matrices, trees, or any other type of data structure. Examples of data storage 120 include, without limitation, tracker parameters 122, candidates 124, comparisons 126, and/or security actions 128.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to automatically identify server-side tracking on websites. For example, and as will be described in greater detail below, one or more of modules 102 may cause computing device 202 and/or server 206 to collect tracker parameters requested by websites, infer event forwarding by detecting two or more of the websites that request a similar set of the tracker parameters, compare content of the two or more of the websites, and perform a security action in response to the comparison.

Computing device 202 generally represents any type or form of computing device capable of reading computer-executable instructions. For example, computing device may be any computer capable of receiving, processing, and storing data. In some examples, computing device may be a user device capable of employing web browsing functionality and/or communicating with a server that provides automated server-side tracking identification services. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of receiving, processing, and storing data. In some examples, the computing device may be a server of a service provider that provides automated server-side tracking identification services. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
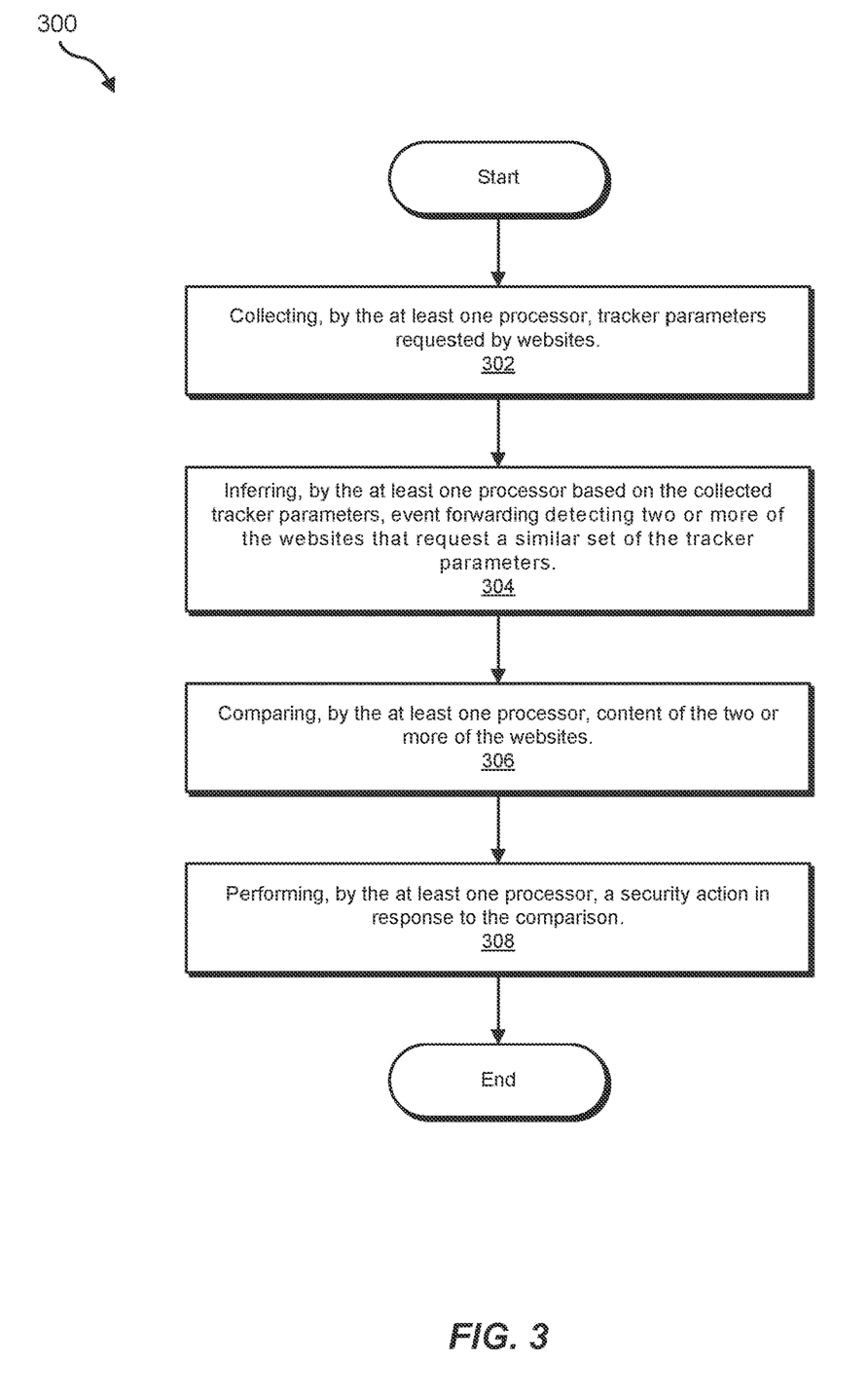
FIG. 3 is a flow diagram of an example method for automatically identifying server-side tracking on websites.

FIG. 3 is a flow diagram of an example computer-implemented method 300 for automatically identifying server-side tracking on websites. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may collect, by at least one processor, information. For example, collection module 104 may, as part of computing device 202 in FIG. 2, collect, by at least one processor, tracker parameters requested by websites.

The term "tracker parameters," as used herein, generally refers to data (e.g., events) requested by a website that are not used by a party that owns and/or controls the website, but rather are forwarded to another party. For example, and without limitation, tracking parameters may include alphanumeric parameters, number of alphanumeric characters, length of alphanumeric characters, a URL, and/or a boolean value.

The systems described herein may perform step 302 in a variety of ways. In one example, collection module 104 may, as part of computing device 202 in FIG. 2, collect information about calls made by two or more of the websites. Alternatively or additionally, collection module 104 may, as part of computing device 202 in FIG. 2, receive the tracker parameters from at least one of one or more browser extensions or one or more web crawlers. Alternatively or additionally, collection module 104 may, as part of computing device 202 in FIG. 2, store one or more sets of parameters used in calls made by the two or more of the websites, types of the parameters, and at least one length of one or more of the parameters.

In an example implementation, collection module 104 may, as part of computing device 202 in FIG. 2, perform parameter collection in order to understand what information is sent to different actors (i.e., third parties) by trackers. As all the information must be redistributed later in the chain, an analysis of the current parameters that are dynamically transmitted is a particularly efficient approach. In order to do so, collection module 104 may leverage two main data points: user telemetry (e.g., from extensions); and request data obtained by crawling a large subset of popular websites and collecting the corresponding calls generated (e.g., "tracker.com/tr/?id=1512&hv=nj2dsa3d&dl=example.com&rl=false"). Collection module 104 may store the distinct set of parameters used in each case, their corresponding types (e.g., numeric and/or alphanumeric), and lengths.

At step 304 one or more of the systems described herein may infer event forwarding. For example, inference module 106 may, as part of computing device 202 in FIG. 2, infer, by the at least one processor based on the collected tracker parameters, event forwarding by detecting two or more of the websites that request a similar set of the tracker parameters.

The term "event forwarding," as used herein, generally refers to transmission of tracker parameters (e.g., events) requested by a website that are not used by a party that owns and/or controls the website, but rather are forwarded to another party. For example, and without limitation, event forwarding may include sending event logs, either via a push or pull mechanism, to one or more centralized servers.

The systems described herein may perform step 304 in a variety of ways. In one example, inference module 106 may, as part of computing device 202 in FIG. 2, infer event forwarding at least in part by identifying at least one case of the two or more of the websites requesting the similar set of the tracker parameters and marking the at least one case as a tracking candidate in response to the identification.

In an example implementation, inference module 106 may, as part of computing device 202 in FIG. 2, use previously collected data to detect other actors receiving the same set of parameters (including type and length). These new actors could be different third parties (e.g., from tracker.com to web.com), or first parties (i.e., the pages visited by the user). If all the different parameters are present in both cases, then module 106 may mark those cases as a possible candidate, as the data collected can be later used for event forwarding on the server side. Following the same example as before:

"web.com/tr/
?id=1512&hv=nj2dsa3d&dl=example.com&rl=false".

At step 306 one or more of the systems described herein may compare websites. For example, comparison module 108 may, as part of computing device 202 in FIG. 2, compare, by the at least one processor, content of the two or more of the websites.

The term "content," as used herein, generally refers to a piece of code that is directly embedded into a website. For example, and without limitation, website content may include website scripts that request tracking parameters from user devices.

The systems described herein may perform step 306 in a variety of ways. In one example, comparison module 108 may, as part of computing device 202 in FIG. 2, compare content at least in part by comparing website scripts that perform requests for the tracker parameters. In such examples, comparison module 108 may, as part of computing device 202 in FIG. 2, identify that at least one website of the two or more of the websites is forwarding the tracker parameters to at least one other website of the two or more of the websites based on the comparison of the website scripts. In comparing website scripts, comparison module 108 may, as part of computing device 202 in FIG. 2, perform a static similarity fuzzy hashing analysis at a code and abstract syntax tree level. Alternatively or additionally, comparison module 108 may, as part of computing device 202 in FIG. 2, compare website scripts at least in part by performing a dynamic JavaScript analysis that matches patterns between the website scripts.

In an example implementation, comparison module 108 may, as part of computing device 202 in FIG. 2, perform a code comparison for an identified candidate to better assess the detection. For example, comparison module 108 may search for similarities in the scripts responsible for performing the associated requests (e.g., "tracker.com/a.js" and "web.com/b.js"). Not all the code from one needs to be present in the other one, as server-side scripts are sometimes "macro" script composed by multiple code snippets.

With the purpose of detecting as many cases as possible, comparison module 108 may perform a two-layer analysis. As one step, comparison module 108 may perform a static similarity fuzzy hashing analysis at the code and Abstract Syntax Tree (AST) level, which will be able to find internal correlations. As another step, comparison module 108 may perform dynamic JavaScript analysis (i.e., instrumenting browser calls), that will match patterns between scripts. The dynamic analysis may consider fingerprinting, date, location, a percentage of pattern match, and/or whether the same actions occur in the same order. The outputs of the static and dynamic analyses may be expressed as percentages of similarity, and comparison module 108 may apply a predetermined similarity percentage threshold (e.g., 90%) to one or more of the results. In some implementations, comparison module 108 may apply different similarity thresholds (e.g., code 70%, AST 90%) to the different results. In some of these implementations, comparison module 108 may determine a confidence measure based on (e.g., as a sum of) amounts above and/or below the thresholds. Comparison module 108 may use the threshold results and/or confidence measure to determine presence of server-side tracking.

At step 308 one or more of the systems described herein may perform a security action. For example, security action module 110 may, as part of computing device 202 in FIG. 2, perform, by the at least one processor, a security action in response to the comparison.

The term "security action," as used herein, generally refers to a computer output responsive to an input indicative of a security concern, taken as a security measure. For example, and without limitation, a security action may be an improvement of a data repository (e.g., whitelist, blacklist, etc.), an alert, or a preventative action (e.g., blocking websites and/or website script requests).

The systems described herein may perform step 308 in a variety of ways. In one example, security action module 110 may, as part of computing device 202 in FIG. 2, improve a data repository of websites automatically identified as performing server-side tracking. Alternatively or additionally, security action module 110 may, as part of computing device 202 in FIG. 2, issue one or more alerts about server-side tracking by at least one website of the two or more of the websites. Alternatively or additionally, security action module 110 may, as part of computing device 202 in FIG. 2, block one or more requests for at least one parameter of the tracker parameters. Alternatively or additionally, security action module 110 may, as part of computing device 202 in FIG. 2, block access to at least one website of the two or more of the websites.

Figure 4:
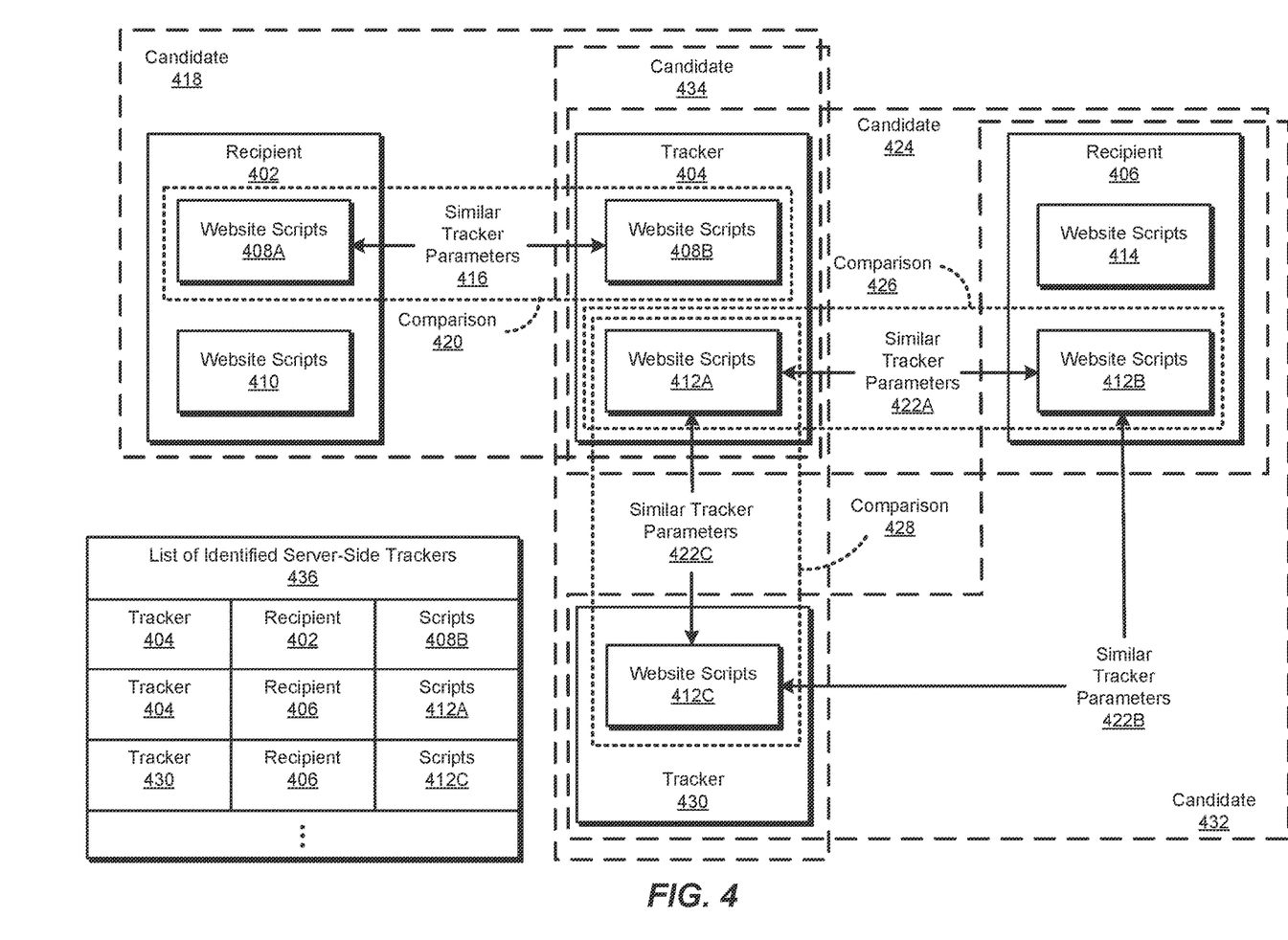
FIG. 4 is block diagram illustrating an example identification of server-side trackers.

As illustrated in FIG. 4, the systems and method disclosed herein may improve a data repository of websites automatically identified as performing server-side tracking. For example, candidates 418, 422, 432, and 434 may be identified based on sets of similar tracker parameters 416 and 422A-422C requested by website scripts 408A, 408B, and 412A-412C of various websites 402, 404, 406, and 430. By making comparisons 420, 426, and 428 of website scripts 408A, 408B, and 412A-412C, a decision may be made whether scripts of websites 402, 404, 406, and 430 are sufficiently similar to determine that server-side tracking is likely for individual candidates 418, 422, 432, and 434. A data repository, such as list 436 of identified server-side trackers, may then be updated based on these decisions.

List 436 may store various types of information. For example, rows of list 436 may store items of information such as domain names and/or URLs of tracker websites 404 and 430 that forward tracker parameters, domain names and/or URLs of recipient websites 402 and 406 that receive tracker parameters 416 and 422A-422C, and/or identifying information of website scripts 408A, 408B, and 412A-412C of tracker websites 404 and 430 that request tracker parameters 416 and 422A-422C.

The systems and methods disclosed herein may improve list 436 in various ways. For example, some server-side tracking scenarios may entail numerous tracker websites (e.g., more than ten) performing server-side tracking and forwarding events to a central repository for redistribution. Thus, in a typical set of cases all exhibiting requests for similar tracker parameters and similar website scripts, each of the websites may be identified as a tracking website and a corresponding entry created in list 436. For tracker websites that forward events to recipient websites on a smaller scale, each website of a candidate having sufficiently similar website scripts may also be stored as an entry in list 436 as a tracker in one entry and a recipient in another entry, but this approach may identify a recipient website as a tracker website and vice versa. Accordingly, the systems and methods disclosed herein may distinguish websites that are trackers from those that are recipients and create entries in list 436 accordingly.

The systems and methods disclosed herein may determine tracker and recipient websites in various ways. For example, if a website has more than one set of tracking scripts that are similar to scripts of two or more other websites, then a determination may be made either that the website that has more than one set of tracking scripts is a tracker and the other websites are recipients or that the website that has more than one set of tracking scripts is a recipient and the other websites are trackers. An example of such a case is illustrated in FIG. 4 as candidates 418 and 424. For example, website scripts 408B of tracker website 404 exhibit similarity to website scripts 408A of recipient website 402. Similarly, website scripts 412A of tracker website 404 exhibit similarity to website scripts 412B of recipient website 406. In response to an observation that tracker website 404 has scripts that are similar to scripts of more than one website and recipient websites 402 and 406 do not, tracker website 404 may be designated as a tracker and recipient websites 402 and 406 may be designated as recipients. However, disambiguation of this situation may benefit from further analysis as detailed below.

In another example, tracker and recipient websites may be determined based on existence of other website scripts, such as website scripts 410 of recipient website 402 and website scripts 414 of recipient website 406, and impact on these scripts as a result of blocking requests of tracking scripts of the respective website. Thus, an observation that may be employed in such cases is whether blocking functionality of tracking website scripts 408A impacts functionality of non-tracking website scripts 410 and whether blocking functionality of tracking website scripts 412B impacts functionality of non-tracking website scripts 414. If a website has scripts that are not tracking scripts and blocking calls of the tracking scripts on that website impacts functionality of the non-tracking scripts, then a possible conclusion may be that the website is using the tracking parameters instead of forwarding the parameters, and thus is likely to be the recipient website of the candidate. Accordingly, if a website is a tracker with respect to a recipient website for one candidate and a recipient with respect to a tracker website for another candidate, impact on that website's non-tracking scripts by blocking of its tracking scripts may be useful in determining whether it is acting in the role of a tracker or recipient in each case.

In another example, tracker and recipient websites may be determined based on combinations of the above and/or other factors. An example of such a case is illustrated in FIG. 4 as candidate 434. In candidate 434, tracker websites 404 and 430 both forward tracking parameters to recipient website 406, but tracker websites 404 and 430 both have similar scripts 412A and 412C that request similar parameters, leading to candidate 434 for which tracker websites 404 and 430 may be forwarding parameters to one another. In this case, neither of tracker websites 404 and 430 have non-tracking scripts that are impacted by blocking functionality of other website scripts of tracker websites 404 and 430. However, if tracker website 404 has already been identified as a tracker or there are other candidates for which tracker website 404 exhibits characteristics of a tracker by having similar scripts to one or more recipient websites (e.g., as is true for tracker website 404), then identification of tracker website 404 as a recipient website for candidate 434 may be avoided. Similarly, since tracker website 430 also has scripts similar to those of recipient website 406 in candidate 432, identification of tracker website 430 as a recipient for candidate 432 may also be avoided.

In some cases, it may be difficult to determine automatically whether a website is a tracker or recipient. For any candidate for which it is difficult to determine automatically whether a website is a tracker or recipient, these situations may be handled in various ways. For example, each website of a candidate having sufficiently similar website scripts may be stored as an entry in list 436 as a tracker in one entry and a recipient in another entry. Alternatively or additionally, no entry may be made in the list for the candidate. Alternatively or additionally, the candidate may be escalated for curation by a human expert. In making such a decision, a confidence measure may be formulated for a website and/or candidate based on a number of websites having similar scripts, whether such websites have identified roles as trackers and/or recipients, impact of blocking of tracking scripts on non-tracking scripts, or combinations thereof. One or more confidence thresholds may be applied to determine whether a role for a website may be determined reliably, and if not, then a determination may be made to escalate one or more corresponding candidates for curation by a human expert.

The improved data repository of websites automatically identified as performing server-side tracking may be stored in a data store and/or transmitted to user devices that have web browsing functionality for use in performing security actions by the user device. Alternatively or additionally, new entries may be transmitted to user devices in order to improve data repositories maintained locally by those user devices. As noted above, the user devices may perform various types of security actions based on contents of the improved data repository.

Figure 5:
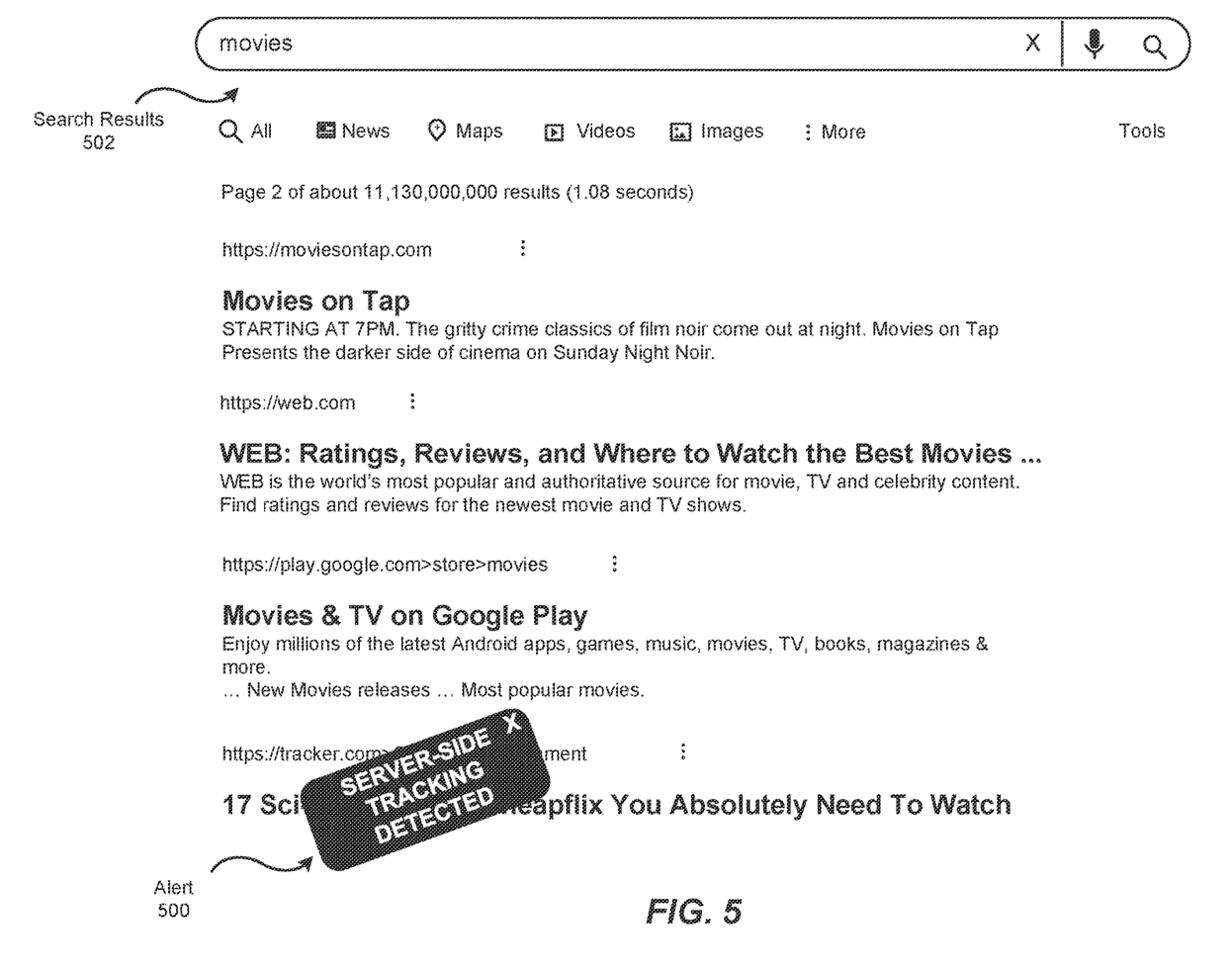
FIG. 5 is a graphical illustration depicting a security action that includes issuing of an alert about a website in browser search results that include the website.

As illustrated in FIG. 5, the performance of a security action may include issuing an alert 500. Such an alert may be issued when a URL is communicated (e.g., displayed) by a user device (e.g., in a text, an email, and/or in browser search results 502). For example, the systems and methods disclosed herein may compare the URLs of websites listed in browser search results 502 to URLs included in a data repository of websites that have been automatically identified as performing server-side tracking. Thus, a website included in search results 502 may be found in the list of identified server-side trackers, prompting issuance of an alert informing the user about the website's status as a server-side tracker.

Alert 500 may be issued in a variety of ways. For example, alert 500 may display text informing a user that a website displayed in browser search results 502 exhibits the behavior of a website that implements server-side tracking. Alert 500 may have a position that correlates the alert with display of website in browser search results 502. For example, alert 500 may be displayed adjacent to the website and/or on top of the website using an overlay. Such an overlay may prevent user selection to navigate to the website. In case of such an overlay, alert 500 may have a control permitting the user to dismiss the alert and/or navigate to the website. In some implementations, alert 500 may display additional text identifying a recipient of information forwarded by the website, thus enabling the user to make an informed decision about whether to navigate to the website. Alert 500 may alternatively or additionally have audible components that inform the user.

Figure 6:
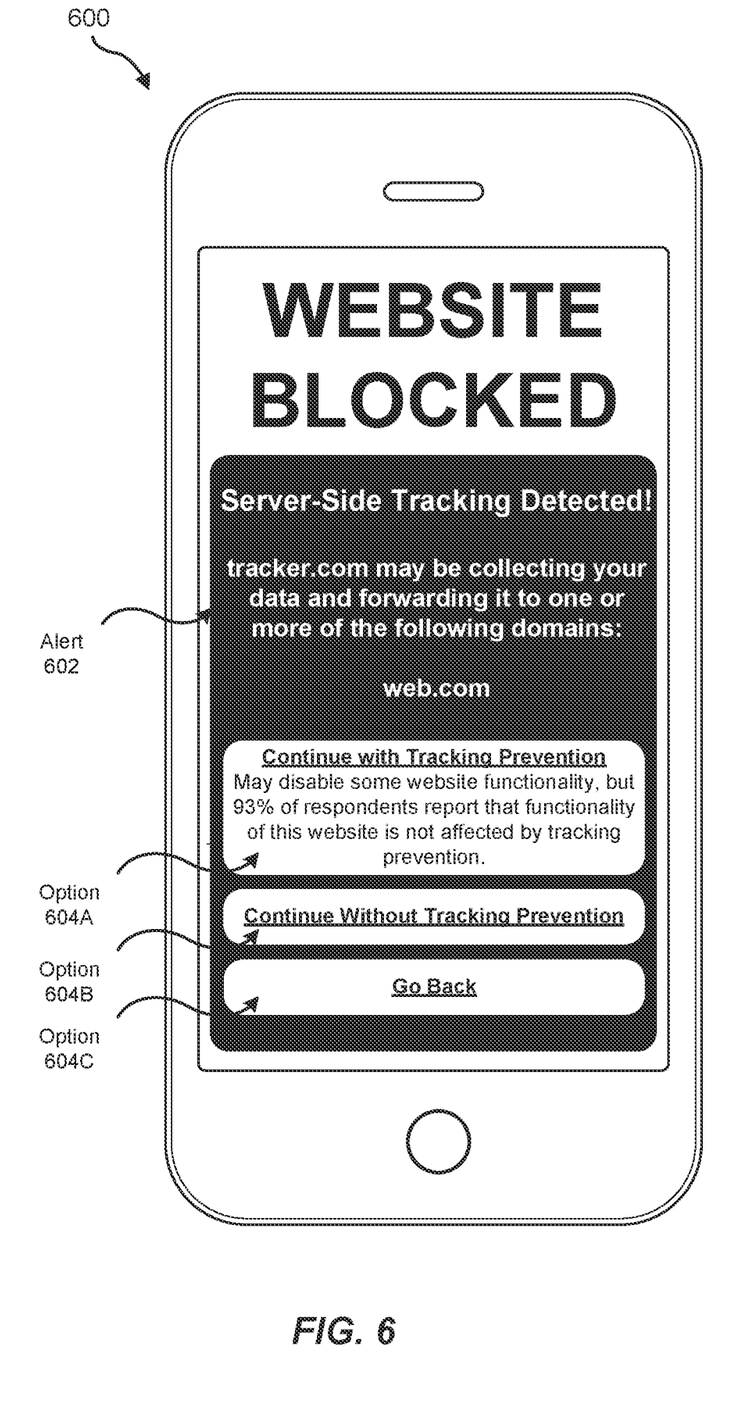
FIG. 6 is a graphical illustration depicting a security action that includes blocking access to a website in addition to issuing an alert about the website when a browser attempts to navigate to the website.

As illustrated in FIG. 6, the performance of a security action may include blocking a website and issuing an alert 602 in response to browser navigation to the website. For example, the systems and methods disclosed herein may compare the URL of the website to URLs included in a data repository of websites that have been identified as performing server-side tracking. Thus, navigation to the website may be prevented and a notification 600 may be displayed to a user that the website has been blocked. Alert 602 may display text informing the user that the navigation to the website was prevented because the website exhibits the behavior of a website that implements server-side tracking. In some implementations, alert 602 may display additional text identifying a recipient of information forwarded by the website, thus enabling the user to make an informed decision about whether to unblock and navigate to the website.

Various options 604A-604C may be presented to the user in the form of controls that allow the user to take one or more actions. For example, option 604A may enable the user to navigate to and interact with the website with tracking prevention measures that block calls made by the website scripts that request the tracking parameters, but that do not block other calls of other website scripts of the website. Text displayed for option 604A may further provide the user with information regarding whether any functionality (e.g., website scripts that do not request any tracking parameters) of the website may be adversely affected by the tracking prevention measures. Crowdsourced user feedback may provide details about such adverse effects and/or information regarding a percentage of users that report adverse effects. For example, when users attempt to interact with the website using tracking prevention, but then choose to disable the tracking prevention and continue to interact with the website, such an event may be detected by a browser extension or VPN and communicated to a service provider via network telemetry. Another type of event may be detected and communicated to the service provider when users attempt to interact with the website using tracking prevention and complete their interaction with the website without disabling the tracking prevention. A ratio of numbers of types of received events may be determined as a percentage of users that do or do not report adverse effects. Advantageously, this feedback may reliably be obtained automatically without any additional effort undertaken by the users. Option 604B may enable the user to navigate to and interact with the website without any tracking prevention measures. Option 604C may enable the user to go back to a previous screen or website, such as browser search results 502 (see FIG. 5).

Advantageously, the disclosed systems and methods automatically identify server-side tracking approaches on websites by detecting parameter exchanges, inferring data sharing, and performing code comparisons. The methodology is based on three different main phases: tracker parameter collection, event forwarding inference, and fine-grained content comparison. Each of these phases includes different steps in order to arrive at the final objective.

The disclosed systems and methods enable service provider to automatically identify server-side trackers and improve a corresponding data repository. The data repository enables enaction of security measures that alert users, block tracking websites, and/or block tracking functionality of websites. As a result, user privacy may be maintained in spite of new and intrusive server-side tracking technology.

Figure 7:
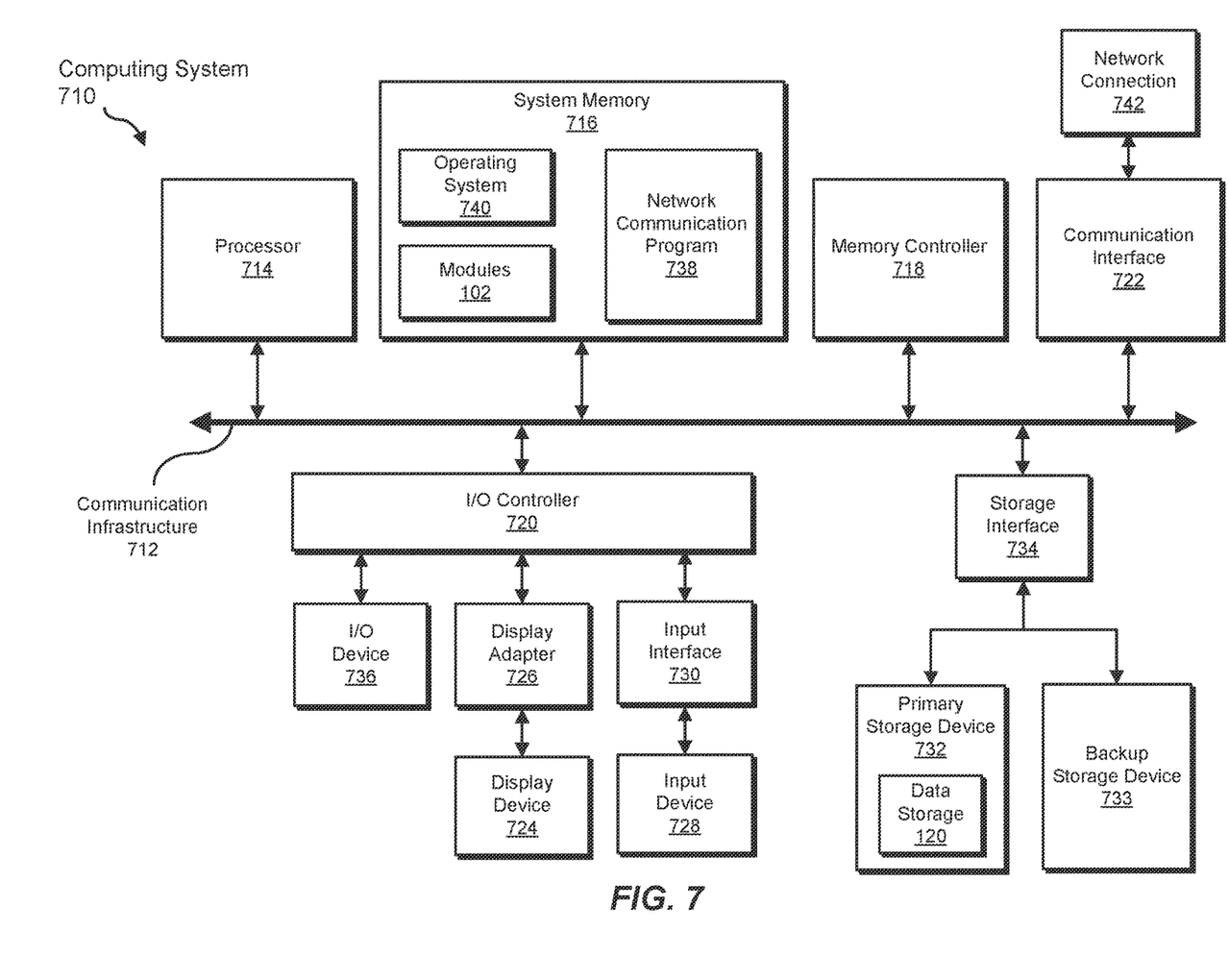
FIG. 7 is a block diagram of an example computing system capable of implementing one or more of the embodiments described and/or illustrated herein.

FIG. 7 is a block diagram of an example computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the example embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In some examples, system memory 716 may store and/or load an operating system 740 for execution by processor 714. In one example, operating system 740 may include and/or represent software that manages computer hardware and software resources and/or provides common services to computer programs and/or applications on computing system 710. Examples of operating system 740 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

As illustrated in FIG. 7, computing system 710 may also include at least one display device 724 coupled to I/O controller 720 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, example computing system 710 may also include at least one input device 728 coupled to I/O controller 720 via an input interface 730. Input device 728 generally represents any type or form of input device capable of providing input, either computer or human generated, to example computing system 710. Examples of input device 728 include, without limitation, a keyboard, a pointing device, a speech recognition device, variations or combinations of one or more of the same, and/or any other input device.

Additionally or alternatively, example computing system 710 may include additional I/O devices. For example, example computing system 710 may include I/O device 736. In this example, I/O device 736 may include and/or represent a user interface that facilitates human interaction with computing system 710. Examples of I/O device 736 include, without limitation, a computer mouse, a keyboard, a monitor, a printer, a modem, a camera, a scanner, a microphone, a touchscreen device, variations or combinations of one or more of the same, and/or any other I/O device.

Communication interface 722 broadly represents any type or form of communication device or adapter capable of facilitating communication between example computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

In some examples, system memory 716 may store and/or load a network communication program 738 for execution by processor 714. In one example, network communication program 738 may include and/or represent software that enables computing system 710 to establish a network connection 742 with another computing system (not illustrated in FIG. 7) and/or communicate with the other computing system by way of communication interface 722. In this example, network communication program 738 may direct the flow of outgoing traffic that is sent to the other computing system via network connection 742. Additionally or alternatively, network communication program 738 may direct the processing of incoming traffic that is received from the other computing system via network connection 742 in connection with processor 714.

Although not illustrated in this way in FIG. 7, network communication program 738 may alternatively be stored and/or loaded in communication interface 722. For example, network communication program 738 may include and/or represent at least a portion of software and/or firmware that is executed by a processor and/or Application Specific Integrated Circuit (ASIC) incorporated in communication interface 722.

As illustrated in FIG. 7, example computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, data storage 120 from FIG. 1 may be stored and/or loaded in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 710 may be configured as an Application Specific Integrated Circuit (ASIC) adapted to implement one or more of the example embodiments disclosed herein.

Figure 8:
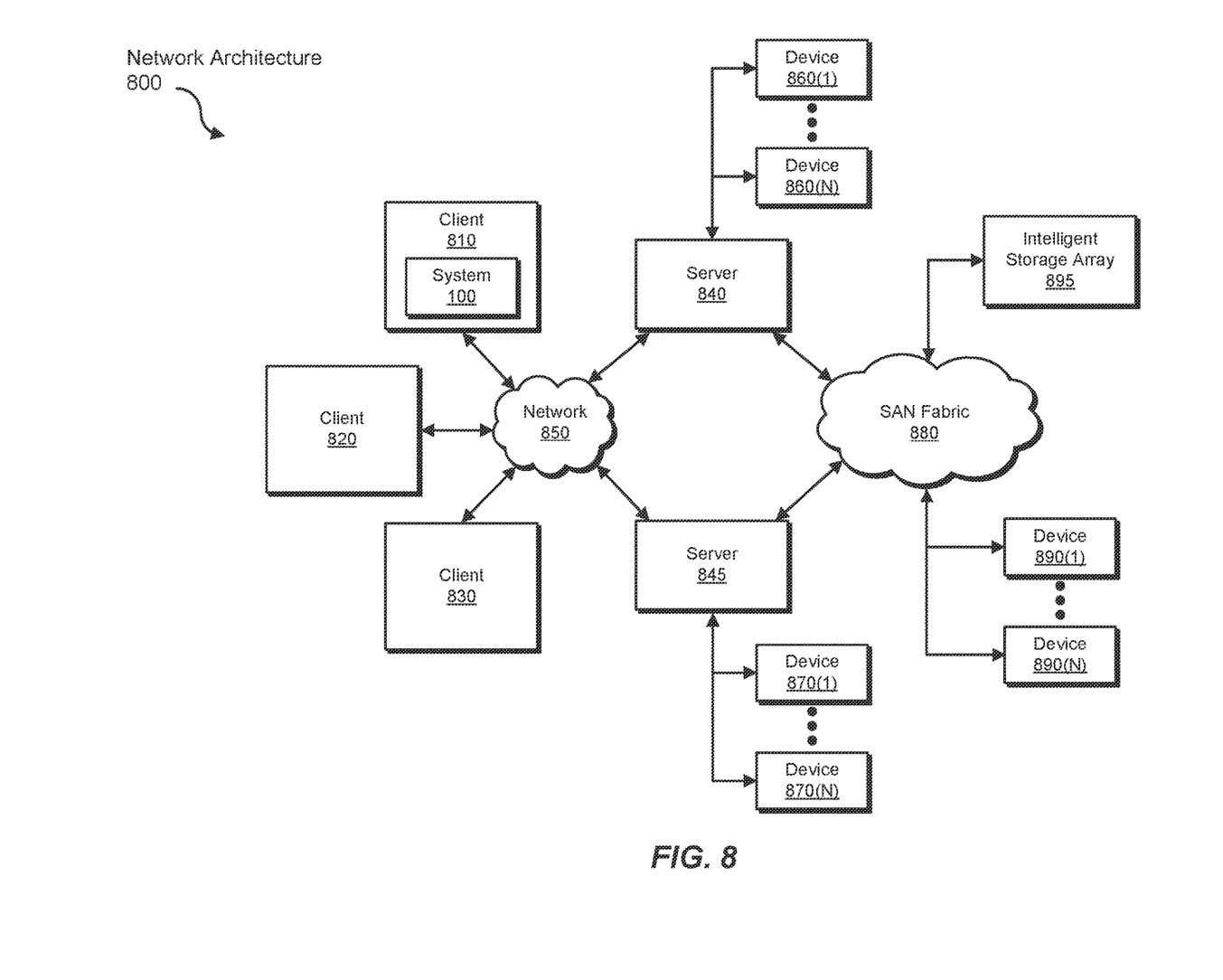
FIG. 8 is a block diagram of an example computing network capable of implementing one or more of the embodiments described and/or illustrated herein.

FIG. 8 is a block diagram of an example network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the present disclosure.

Client systems 810, 820, and 830 generally represent any type or form of computing device or system, such as example computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860 (1)-(N) may be directly attached to server 840. Similarly, one or more storage devices 870 (1)-(N) may be directly attached to server 845. Storage devices 860 (1)-(N) and storage devices 870 (1)-(N) generally represent any type or form of storage device or medium capable of storing data and/or other computer-readable instructions. In certain embodiments, storage devices 860 (1)-(N) and storage devices 870 (1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890 (1)-(N) and/or an intelligent storage array 895. SAN fabric 880 may also facilitate, via network 850 and servers 840 and 845, communication between client systems 810, 820, and 830 and storage devices 890 (1)-(N) and/or intelligent storage array 895 in such a manner that devices 890 (1)-(N) and array 895 appear as locally attached devices to client systems 810, 820, and 830. As with storage devices 860 (1)-(N) and storage devices 870 (1)-(N), storage devices 890 (1)-(N) and intelligent storage array 895 generally represent any type or form of storage device or medium capable of storing data and/or other computer-readable instructions.

In certain embodiments, and with reference to example computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860 (1)-(N), storage devices 870 (1)-(N), storage devices 890 (1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 840, server 845, storage devices 860 (1)-(N), storage devices 870 (1)-(N), storage devices 890 (1)-(N), intelligent storage array 895, or any combination thereof. All or a portion of one or more of the example embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an example method for automatically identifying server-side tracking on websites.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive tracker parameters to be transformed, transform the tracker parameters, output a result of the transformation to infer data forwarding, use the result of the transformation to compare website content, and store the result of the transformation to trigger a security action. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for automatically identifying server-side tracking on websites, at least a portion of the method being performed by a computing device comprising at least one processor, the method comprising:
   collecting, by the at least one processor, tracker parameters requested by the websites;
   inferring, by the at least one processor based on the collected tracker parameters, event forwarding by detecting two or more of the websites that request a similar set of the tracker parameters;
   comparing, by the at least one processor, first content of a first website of the two or more of the websites with second content of a second website of the two or more websites; and
   performing, by the at least one processor, a security action in response to the comparison finding similarity of the first content to the second content.

2. The method of claim 1, wherein the collecting tracker parameters includes collecting information about calls made by the two or more of the websites.

3. The method of claim 1, wherein the collecting tracker parameters includes receiving the tracker parameters from at least one of one or more browser extensions or one or more web crawlers.

4. The method of claim 1, wherein the collecting tracker parameters includes storing one or more sets of parameters used in calls made by the two or more of the websites, types of the tracker parameters, and at least one length of one or more of the tracker parameters.

5. The method of claim 1, wherein the inferring event forwarding includes identifying at least one case of the two or more of the websites requesting the similar set of the tracker parameters and marking the at least one case as a tracking candidate in response to the identification.

6. The method of claim 1, wherein the comparing content includes comparing website scripts that perform requests for the tracker parameters, the method further comprising:
   identifying that at least one website of the two or more of the websites is forwarding the tracker parameters to at least one other website of the two or more of the websites based on the comparison of the website scripts.

7. The method of claim 6, wherein the comparing website scripts includes at least one of:
   performing a static similarity fuzzy hashing analysis at a code and abstract syntax tree level; or
   performing a dynamic JavaScript analysis that matches patterns between the website scripts.

8. The method of claim 1, wherein the security action includes at least one of:
   improving a data repository of websites automatically identified as performing server-side tracking;
   issuing one or more alerts about server-side tracking by at least one website of the two or more of the websites;
   blocking one or more requests for at least one parameter of the tracker parameters; or
   blocking access to at least one website of the two or more of the websites.

9. A system for automatically identifying server-side tracking on websites, the system comprising:
   at least one physical processor;
   physical memory comprising computer-executable instructions that, when executed by the physical processor, cause the physical processor to:
      collect tracker parameters requested by the websites;
      infer, based on the collected tracker parameters, event forwarding by detecting two or more of the websites that request a similar set of the tracker parameters;
      compare first content of a first website of the two or more of the websites with second content of a second website of the two or more websites; and
      perform a security action in response to the comparison finding similarity of the first content to the second content.

10. The system of claim 9, wherein the instructions cause the physical processor to collect the tracker parameters at least in part by collecting information about calls made by the two or more of the websites.

11. The system of claim 9, wherein the instructions cause the physical processor to collect the tracker parameters at least in part by receiving the tracker parameters from at least one of one or more browser extensions or one or more web crawlers.

12. The system of claim 9, wherein the instructions cause the physical processor to collect the tracker parameters at least in part by storing one or more sets of parameters used in calls made by the two or more of the websites, types of the parameters, and at least one length of one or more of the parameters.

13. The system of claim 9, wherein the instructions cause the physical processor to infer the event forwarding at least in part by identifying at least one case of the two or more of the websites requesting the similar set of the tracker parameters and marking the at least one case as a tracking candidate in response to the identification.

14. The system of claim 9, wherein the instructions cause the physical processor to compare the content at least in part by comparing website scripts that perform requests for the tracker parameters, the instructions further causing the physical processor to identify that at least one website of the two or more of the websites is forwarding the tracker parameters to at least one other website of the two or more of the websites based on the comparison of the website scripts.

15. The system of claim 14, wherein the instructions cause the physical processor to compare the website scripts at least in part by at least one of:

performing a static similarity fuzzy hashing analysis at a code and abstract syntax tree level; or performing a dynamic JavaScript analysis that matches patterns between the website scripts.

16. The system of claim 9, wherein the security action includes at least one of:

improving a data repository of websites automatically identified as performing server-side tracking;

issuing one or more alerts about server-side tracking by at least one website of the two or more of the websites;

blocking one or more requests for at least one parameter of the tracker parameters; or blocking access to at least one website of the two or more of the websites.

17. A non-transitory computer-readable medium comprising one or more computer-executable instructions that, when executed by at least one processor of a computing device, cause the computing device to:

collect tracker parameters requested by websites;

infer, based on the collected tracker parameters, event forwarding by detecting two or more of the websites that request a similar set of the tracker parameters;

compare first content of a first website of the two or more of the websites with second content of a second website of the two or more websites; and perform a security action in response to the comparison finding similarity of the first content to the second content.

18. The non-transitory computer-readable medium of claim 17, wherein the instructions cause the computing device to infer the event forwarding at least in part by identifying at least one case of the two or more of the websites requesting the similar set of the tracker parameters and marking the at least one case as a tracking candidate in response to the identification.

19. The non-transitory computer-readable medium of claim 17, wherein the instructions cause the computing device to compare the content at least in part by comparing website scripts that perform requests for the tracker parameters, the instructions further causing the computing device to:

identify that at least one website of the two or more of the websites is forwarding the tracker parameters to at least one other website of the two or more of the websites based on the comparison of the website scripts.

20. The non-transitory computer-readable medium of claim 19, wherein the instructions cause the computing device to compare the website scripts at least in part by at least one of:

performing a static similarity fuzzy hashing analysis at a code and abstract syntax tree level; or performing a dynamic JavaScript analysis that matches patterns between the website scripts.

* * * * *